(12) United States Patent
Yamada et al.

(10) Patent No.: US 9,327,615 B2
(45) Date of Patent: May 3, 2016

(54) SEAT SLIDE DEVICE FOR VEHICLE

(71) Applicant: AISIN SEIKI KABUSHIKI KAISHA, Kariya (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/438,950

(22) PCT Filed: Sep. 27, 2013

(86) PCT No.: PCT/JP2013/076352
§ 371 (c)(1),
(2) Date: Apr. 28, 2015

(87) PCT Pub. No.: WO2014/069133
PCT Pub. Date: May 8, 2014

(65) Prior Publication Data
US 2015/0291062 A1      Oct. 15, 2015

(30) Foreign Application Priority Data

Oct. 30, 2012   (JP) ................................. 2012-239603

(51) Int. Cl.
*F16C 29/04* (2006.01)
*B60N 2/07* (2006.01)
(Continued)

(52) U.S. Cl.
CPC .............. *B60N 2/0705* (2013.01); *B60N 2/073* (2013.01); *B60N 2/0715* (2013.01);
(Continued)

(58) Field of Classification Search
CPC ........ F16C 29/04; F16C 29/005; F16C 33/32; B60N 2/06; B60N 2/0705; B60N 2/0715; B60N 2/825

USPC ................ 384/34, 47, 49; 249/424, 429–430; 296/66.14, 66.15; 248/424, 429–430
See application file for complete search history.

(56) References Cited

U.S. PATENT DOCUMENTS 5,522,665 A * 6/1996 Baloche ............... B60N 2/0715
                                                                  384/47
5,692,839 A    12/1997 Rohee et al.
(Continued)

FOREIGN PATENT DOCUMENTS

CN             1749066 A        3/2006
DE    10 2010 043 979 A1        3/2012
(Continued)

OTHER PUBLICATIONS

International Preliminary Report of Patentability and Written Opinion issued May 5, 2015 in PCT/JP2013/076352 (English translation only).
(Continued)

*Primary Examiner* — Marcus Charles
(74) *Attorney, Agent, or Firm* — Oblon, McClelland, Maier & Neustadt, L.L.P

(57) ABSTRACT

A seat slide device for a vehicle includes a first rail, which includes a first horizontal wall, a first vertical wall, and a first flange, and a second rail, which includes a second vertical wall and a second flange. A joining was connects the second vertical wall with the second flange. The coupling portion between the first horizontal and vertical walls includes a first ball guide. The basal end portion of the second flange includes a second ball guide. A first ball is arranged between the first and second ball guides. A restricting member that projects on the first horizontal wall functions to reduce a vertical space between the joining wall and the first horizontal wall and is contactable to the joining wall when the second vertical wall is deformed due to a load that is applied to produce pushing force between the first ball and the second rail.

8 Claims, 7 Drawing Sheets

(51) Int. Cl.
*B60N 2/08* (2006.01)
*F16C 29/00* (2006.01)

(52) U.S. Cl.
CPC ........... *B60N 2/0722* (2013.01); *B60N 2/0818* (2013.01); *B60N 2/0875* (2013.01); *F16C 29/005* (2013.01); *F16C 29/043* (2013.01); *F16C 29/048* (2013.01)

(56) References Cited

U.S. PATENT DOCUMENTS

| | | | | |
|---|---|---|---|---|
| 7,669,826 B2* | 3/2010 | Hayakawa | ........... | B60N 2/0705 248/430 |
| 8,038,197 B2* | 10/2011 | Koga | ........... | B60N 2/067 296/65.18 |
| 8,297,583 B2* | 10/2012 | Kimura | ........... | B60N 2/0705 384/47 |
| 8,814,123 B2* | 8/2014 | Suzuki | ........... | B60N 2/0705 248/429 |
| 8,894,032 B2* | 11/2014 | Walter | ........... | B60N 2/0705 248/430 |
| 2003/0168567 A1* | 9/2003 | Klahold | ........... | B60N 2/0705 248/429 |
| 2011/0017897 A1* | 1/2011 | Christoffel | ........... | B60N 2/0722 248/429 |
| 2012/0160981 A1 | 6/2012 | Kimura | | |
| 2012/0199719 A1* | 8/2012 | Yamada | ........... | B60N 2/0705 248/430 |
| 2012/0305734 A1* | 12/2012 | Balin | ........... | B60N 2/072 248/424 |
| 2014/0110553 A1* | 4/2014 | Hoshihara | ........... | B60N 2/06 248/429 |
| 2014/0239141 A1* | 8/2014 | Yamada | ........... | B60N 2/08 248/430 |

FOREIGN PATENT DOCUMENTS

| | | | |
|---|---|---|---|
| FR | 2 889 120 A1 | 2/2007 | |
| JP | 09-193695 A | 7/1997 | |
| JP | 2007-176220 A | 7/2007 | |
| JP | 2008-044518 A | 2/2008 | |
| JP | 2010-202113 A | 9/2010 | |
| JP | 2012-126381 A | 7/2012 | |
| JP | 5280134 B2 * | 9/2013 | |
| WO | WO 2009022214 A1 * | 2/2009 | ........... B60N 2/0702 |

OTHER PUBLICATIONS

International Search Report issued Jan. 7, 2014 in PCT/JP2013/076352 Filed Sep. 27, 2013.

Extended European Search Report issued Oct. 9, 2015 in Patent Application No. 13850829.6.

* cited by examiner

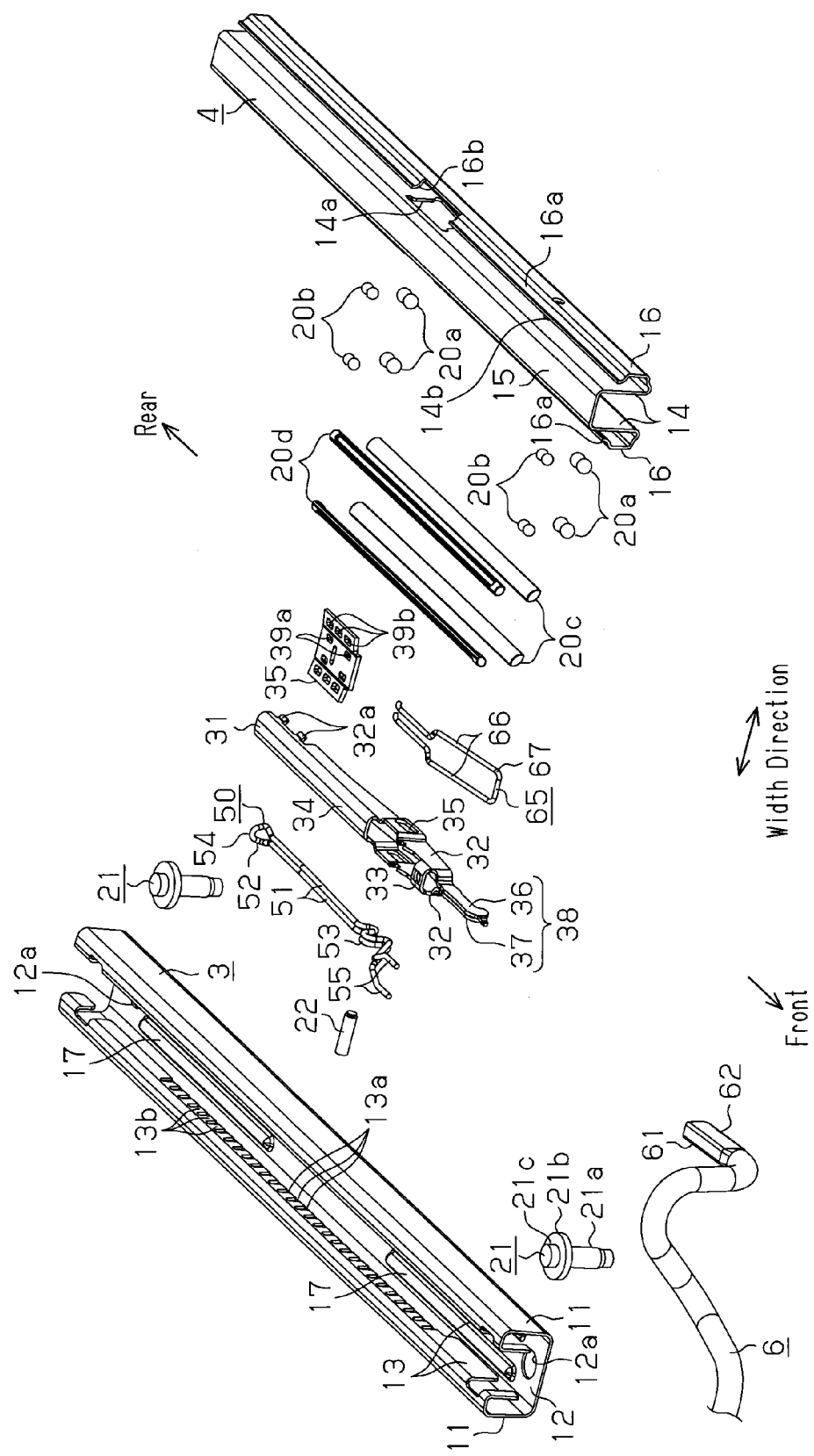

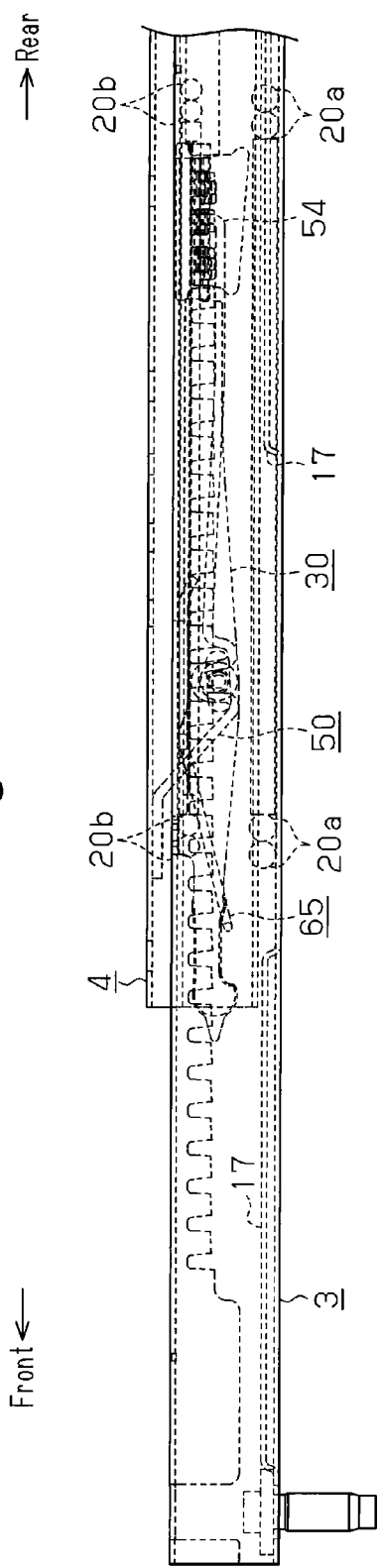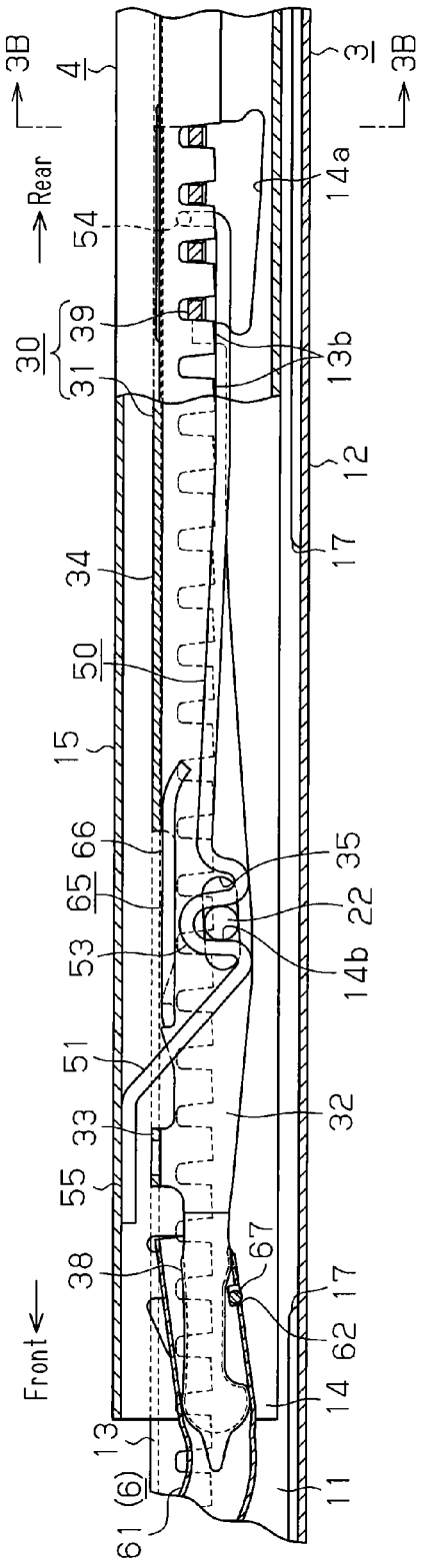

SEAT SLIDE DEVICE FOR VEHICLE

CROSS-REFERENCE TO RELATED APPLICATIONS

This is a U.S. National Stage application of International patent application PCT/JP2013/076352 filed Sep. 27, 2013 which claims priority to Japanese patent application 2012-239603 of Oct. 30, 2012.

TECHNICAL FIELD

The techniques of the present disclosure relate to a seat slide device for a vehicle.

BACKGROUND ART

For example, Patent Document 1 discloses a device known as a seat slide device for a vehicle. FIG. 8 shows the seat slide device for a vehicle, which includes a lower rail 101 and an upper rail 111. The upper rail 111 is coupled to the lower rail 101 to be movable in the vehicle front-rear direction (the direction perpendicular to the sheet of FIG. 8).

The lower rail 101 is substantially uniform in cross-section in the vehicle front-rear direction. The lower rail 101 has a pair of first vertical walls 102, which extends vertically on the widthwise two sides, and a bottom wall 103, which couples the lower ends of the first vertical walls 102 to each other. A first flange 104 continuously extends from the upper end of each first vertical wall 102. The first flange 104 projects widthwise inward from the upper end of the first vertical wall 102 and is folded back toward the bottom wall 103.

The upper rail 111 is substantially uniform in cross-section in the vehicle front-rear direction. The upper rail 111 has a pair of second vertical walls 112, which extends vertically between the first flanges 104 of the lower rail 101, and a top wall 113, which couples the upper ends of the second vertical walls 112 to each other. A second flange 114 continuously extends from the lower end of each second vertical wall 112. The second flange 114 projects widthwise outward from the lower end of the second vertical wall 112 and then is folded back toward an area between the corresponding first vertical wall 102 and the corresponding first flange 104.

A first lower ball guide 105 is formed at the coupling portion between each first vertical wall 102 and the bottom wall 103, and a second lower ball guide 115 is formed at the lower end of each second flange 114. A lower ball 120a is rotationally arranged between the first lower ball guide 105 and the corresponding second lower ball guide 115. The coupling portion between the first vertical wall 102 and the corresponding first flange 104 includes a first upper ball guide 106. The second flange 114 has an upper end portion including a second upper ball guide 116. An upper ball 120b is rotationally arranged between the first and second upper ball guides 106 and 116.

The lower ball 120a and the upper ball 120b are rotational between the upper rail 111 and the lower rail 101. Thus, the lower rail 101 supports the upper rail 111 to be movable in the vehicle front-rear direction.

PRIOR ART DOCUMENTS

Patent Document

Patent Document 1: Japanese Laid-Open Patent Publication No. 2012-126381

SUMMARY OF THE INVENTION

Problems that the Invention is to Solve

In Patent Document 1, a vertical bending moment around the position of the lower ball 120a in the vehicle front-rear direction is produced in the lower rail 101 and the upper rail 111, for example, when a collision with another vehicle applies a heavy load to the seat and the seat slide device in the vehicle front-rear direction. At this moment, the second vertical walls 112 are deformed inward while being guided by the lower balls 120a. The upper rail 111 is likely to be bent and deformed such that a longitudinal end (the front or rear end) of the upper rail 111 moves down as shown in FIG. 9. In this case, it is difficult to stop the progress of bending deformation in the upper rail 111, for example, unless the distal end (the front or rear end) of the upper rail 111 comes into contact with the inner surface of the bottom (the top surface of the bottom wall 103) of the lower rail 101.

An objective of the present invention is to provide a seat slide device for a vehicle that promptly suppresses the progress of vertical bending deformation when receiving a heavy load in the vehicle front-rear direction.

Means for Solving the Problems

In order to attain the above objective, a seat slide device for a vehicle includes a first rail, a second rail, a first ball guide, a second ball guide, a first ball, and a restricting member. The first rail is adapted to extend in a vehicle front-rear direction. The first rail includes a first horizontal wall, a first vertical wall, and a first flange. The first vertical wall extends from at least one end in a width direction of the first horizontal wall. The first flange projects in the width direction from a distal end of the first vertical wall to overhang the first horizontal wall and is folded back toward the first horizontal wall. The second rail is coupled to the first rail to be movable in the vehicle front-rear direction. The second rail includes a second vertical wall, a second flange, and a joining wall. The second vertical wall is arranged on an opposite side of the first vertical wall from the first flange in the width direction and has an end portion close to the first horizontal wall. The second flange projects in the width direction from the end portion of the second vertical wall toward the first vertical wall and is folded back toward an area between the first vertical wall and the first flange. The joining wall is arranged between the second vertical wall and the second flange. The first ball guide is formed in a coupling portion between the first horizontal wall and the first vertical wall. The second ball guide is formed in a basal portion of the second flange. The first ball is rotationally arranged between the first ball guide and the second ball guide. The restricting member projects on a portion of the first horizontal wall that is closer to a distal end of the first rail than at least the first ball in the vehicle front-rear direction and reduces a vertical space between the joining wall and the first horizontal wall. The restricting member is configured to be capable of contacting the joining wall when the second vertical wall is deformed due to a load that is applied to produce pushing force between the first ball and the second rail.

BRIEF DESCRIPTION OF THE DRAWINGS

FIG. 2 is an exploded perspective view of a seat slide device for a vehicle according to one embodiment;

FIG. 4A is a side view of the seat slide device for a vehicle of FIG. 2;

FIG. 4B is a side cross-sectional view of the seat slide device for a vehicle of FIG. 2;

MODES FOR CARRYING OUT THE INVENTION

A seat slide device for a vehicle according to one embodiment will now be described. In the following description, the front-rear direction of a vehicle is simply referred to as a "front-rear direction."

Figure 1:
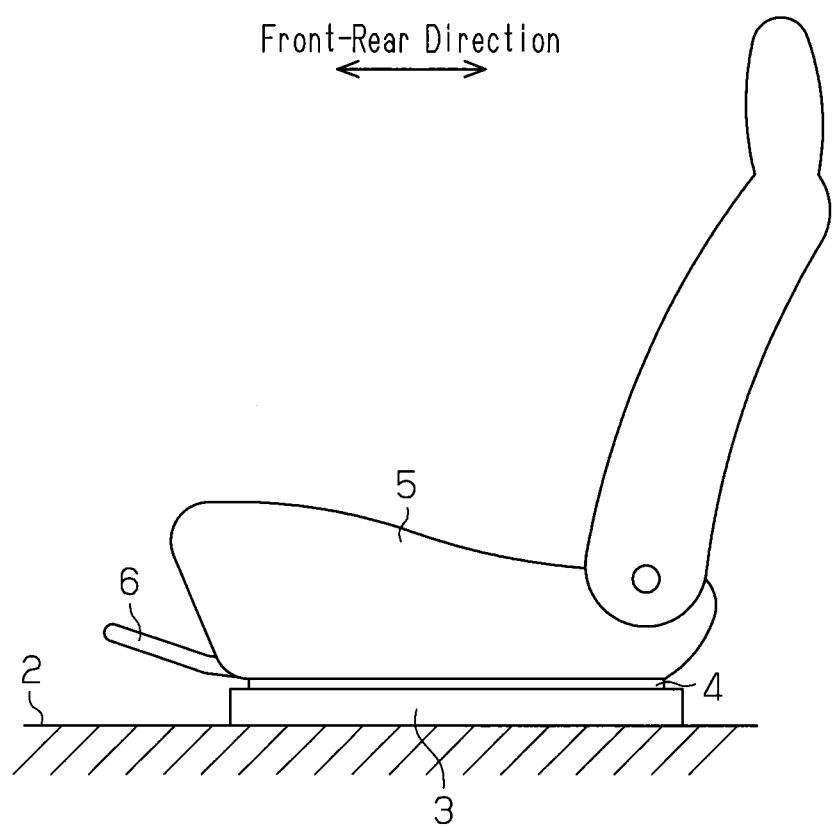
FIG. 1 is a side view of a vehicle seat according to the present disclosure.

As shown in FIG. 1, a lower rail 3, as a first rail, is fixed to a vehicle floor 2 to extend in the front-rear direction. An upper rail 4, as a second rail, is mounted on the lower rail 3 to be movable relative to the lower rail 3 in the front-rear direction. In other words, the longitudinal direction (the direction of the relative movement) of the lower rail 3 and the upper rail 4 is the same as the front-rear direction in the present embodiment.

Two sets of the lower rail 3 and the upper rail 4 are arranged at an interval in the width direction (the direction perpendicular to the sheet of FIG. 1). The drawing shows one set of the lower rail 3 and the upper rail 4 that is located on the left side as facing forward. A seat 5, on which an occupant is seated, is fixed to and supported by the upper rails 4. The relative movement between the upper rails 4 and the lower rails 3 is basically restricted. The restriction is removed by operation of a release handle 6.

As shown in FIG. 2, the lower rail 3, which is made of a plate, has a pair of first vertical walls 11, which extends vertically on the widthwise two sides, and a bottom wall 12 as a first horizontal wall, which couples the basal ends (the lower ends) of the first vertical walls to each other. Each first vertical wall 11 is continuous to a first flange 13, which extends from the distal end (the upper end) of the first vertical wall 11. The first flange 13 projects widthwise inward from the distal end of the first vertical wall 11 and is folded back toward the bottom wall 12.

Each first flange 13 of the lower rail 3 has a plurality of cutouts 13a in a longitudinal middle portion. The cutouts 13a are arranged in the longitudinal direction at predetermined intervals. The cutouts 13a are formed by forming upward cutouts from the distal edge (the lower end) of the first flange 13. A locking tooth 13b, which is shaped like a rectangular tooth, is formed between respective adjacent cutouts 13a. Thus, a plurality of locking teeth 13b are arranged in the longitudinal direction of the lower rail 3 at predetermined intervals.

The lower rail 3 is fastened to the vehicle floor 2 at the longitudinal front end and the longitudinal rear end of the bottom wall 12. In particular, the bottom wall 12 of the lower rail 3 includes round bolt inserting through holes 12a at the front end and the rear end. Each bolt inserting through hole 12a receives a mounting bolt 21, of which the bolt body 21a has a vertical axis and passes through the bolt inserting through hole 12a. The mounting bolt 21 integrally includes a substantially annular flange 21b, which spreads radially outward from the upper end of the bolt body 21a, and a head 21c, which projects upward from the top surface of the flange 21b. The bolt body 21a is inserted through the bolt inserting through hole 12a and threaded to a nut hole (not shown) of the vehicle floor 2. The mounting bolt 21 is fastened to fix the lower rail 3 to the vehicle floor 2 until the flange 21b comes into contact with the rim of the bolt inserting through hole 12a. The bolt inserting through hole 12a and its rim correspond to a mounting position of the lower rail 3 at which the lower rail 3 is mounted to the vehicle floor 2. The lower rail 3 is attached to the vehicle floor 2 with the mounting bolt 21 (a mounting member) placed at the mounting position.

Figure 3A:
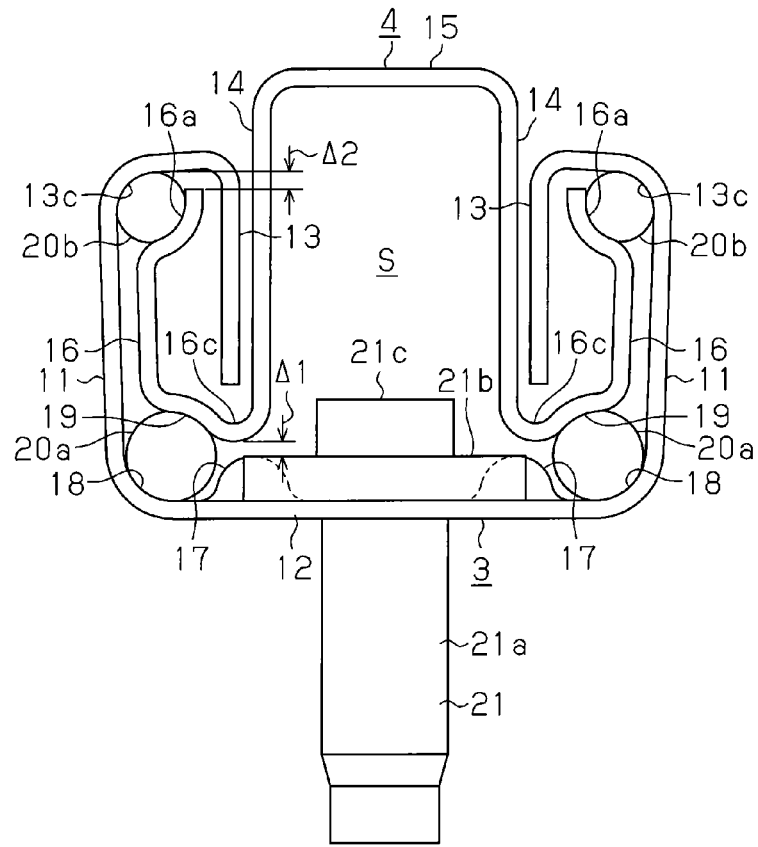
FIG. 3A is a front view of the seat slide device for a vehicle of FIG. 2.
Figure 3B:
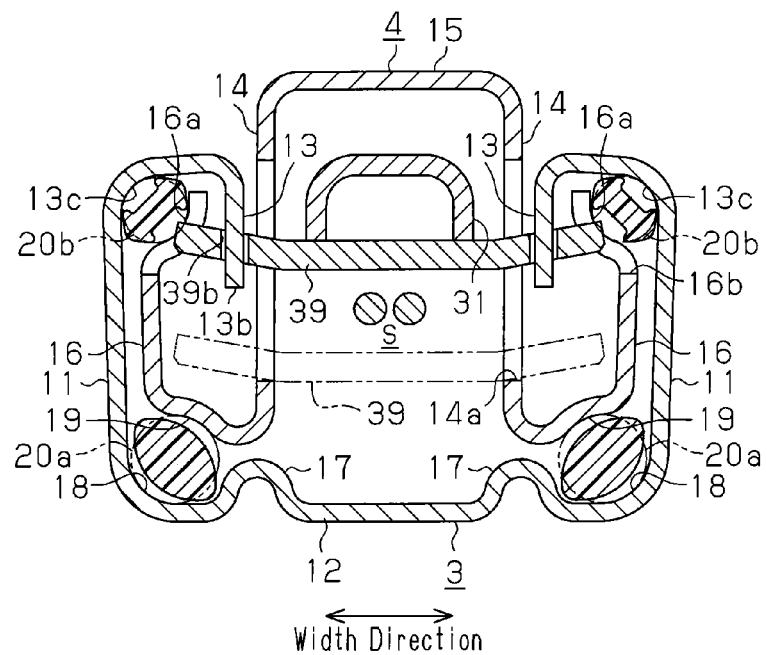
FIG. 3B is a front cross-sectional view of the seat slide device for a vehicle of FIG. 2.

The bottom wall 12 has a pair of projections 17 at a front end portion that is located behind the bolt inserting through hole 12a on the front side and another pair of projections 17 at a rear end portion that is located in front of the bolt inserting through hole 12a on the rear side. Each pair of projections 17 functions as a restricting member. The projections 17 are integrated with the bottom wall 12 and arranged side by side in the width direction of the bottom wall 12 to extend in the front-rear direction. Referring to FIG. 3A and FIG. 3B together, the projections 17 each have a substantially semicircular shape in cross-section and project upward. The widthwise distance between the projections 17 is equal to the diameter of the flange 21b of the mounting bolt 21. The projecting amount of each projection 17 is equal to the thickness of the flange 21b.

The coupling portion between each first vertical wall 11 and the bottom wall 12 of the lower rail 3 includes a first lower ball guide 18 as a first ball guide, which has a substantially semicircular shape in cross-section to project diagonally downward. The coupling portion between the vertical wall 11 and the corresponding first flange 13 includes a first upper ball guide 13c, which has a substantially semicircular shape in cross-section to project diagonally upward.

Each upper rail 4, which is made of a plate, has a pair of second vertical walls 14, which extend vertically between the first flanges 13 of the lower rail 3, and a top wall 15 as a second horizontal wall. The top wall 15 couples the basal ends (the upper ends) of the second vertical walls 14, which are located far from the lower rail 3, to each other. Each second vertical wall 14 is continuous to a second flange 16, which extends from the end (the lower end) of the second vertical wall 14 that is located close to the bottom wall 12. The second flange 16 projects widthwise outward from the lower end of the second vertical wall 14 and is folded back between the corresponding first vertical wall 11 and the corresponding first flange 13.

In particular, the lower rail 3 and the upper rail 4 have U-shapes in cross-section such that the opening of the lower rail 3 faces the opening of the upper rail 4. The first flanges 13 of the lower rail 3 engage with the second flanges 16 of the upper rail 4 to basically prevent a vertical fall. The cross-section formed by the lower rail 3 and the upper rail 4 is rectangular like a box. The lower rail 3 defines a space S with the upper rail 4.

Each second flange 16 has a lower end portion (a basal portion) including a second lower ball guide 19 as a second ball guide, which has a substantially arcuate shape in cross-section to project diagonally upward. The upper end portion (the distal portion) of the second flange 16 includes a second upper ball guide 16*a*, which has a substantially arcuate shape in cross-section to project diagonally downward. The second lower ball guide 19 has a radius of curvature that is set equal to the radius of curvature of the corresponding first lower ball guide 18. The second upper ball guide 16*a* has a radius of curvature that is set equal to the radius of curvature of the corresponding first upper ball guide 13*c*.

A joining wall 16*c* between each second flange 16 and the corresponding second vertical wall 14 has a substantially arcuate shape in cross-section to project downward and fit the shape of the second lower ball guide 19. The joining wall 16*c* faces the corresponding projection 17 substantially in the vertical direction. The highest point (the extremity in the vertical direction) of the projection 17 is located closer to the widthwise center than the lowest point (the extremity in the vertical direction) of the joining wall 16*c*.

A lower ball 20*a* is placed between each second lower ball guide 19 of the upper rail 4 and the first lower ball guide 18 of the lower rail 3 that faces the second lower ball guide 19. The lower ball 20*a* has a radius set less than the curvature radiuses of the first and second lower ball guides 18 and 19. In a similar manner, an upper ball 20*b* is placed between each second upper ball guide 16*a* of the upper rail 4 and the first upper ball guide 13*c* of the lower rail 3 that faces the second upper ball guide 16*a*. The upper ball 20*b* has a radius set less than the curvature radiuses of the first and second upper ball guides 13*c* and 16*a* and less than the radius of the lower ball 20*a*. The reason for the lower ball 20*a* designed to have a greater radius than the upper ball 20*b* is for ensuring a vertical distance between the top of the flange 21*b* of the mounting bolt 21 and the lower end of the joining wall 16*c*.

As shown in FIG. 2, the lower balls 20*a* are placed in a pair of plastic holders 20*c*, which extends in the front-rear direction (the longitudinal direction of the rails). The number of the lower balls 20*a* placed in each holder 20*c* is four in total, with two placed in the front end portion of the holder 20*c* and the other two placed in the rear end portion of the holder 20*c*. In a similar manner, the upper balls 20*b* are placed in a pair of plastic holders 20*d*, which extends in the front-rear direction (the longitudinal direction of the rails) with the same length as the holder 20*c*. The number of upper balls 20*b* placed in each holder 20*d* is four in total, with two placed in the front portion of the holder 20*d* and the other two placed in the rear end portion of the holder 20*d*. Each lower ball 20*a* and each upper ball 20*b* can roll between the upper rail 4 and the lower rail 3. As a result, the upper rail 4 is supported by the lower rail 3 to be moveable in the longitudinal direction (the front-rear direction).

The moving range of the upper rail 4 relative to the lower rail 3 is limited to a certain range by a suitable stopper mechanism. The projections 17 on the front side of the lower rail 3 are arranged to include the front end position of the upper rail 4 in the movable range of the upper rail 4 relative to the lower rail 3 except the mounting position (such as the bolt inserting through hole 12*a*) of the lower rail 3 on the vehicle floor 2. In a similar manner, the projections 17 on the rear side are arranged to include the rear end position of the upper rail 4 in the movable range of the upper rail 4 relative to the lower rail 3 except the mounting position of the lower rail 3 on the vehicle floor 2. In other words, each projection 17 is arranged in the movable range of the corresponding distal end (the front end or the rear end) of the upper rail 4 relative to the lower rail 3 except the mounting position of the lower rail 3 on the vehicle floor 2. Both cases are premised on that the front or rear end of the upper rail 4 is located on the lower rail 3 (the bottom wall 12).

As shown in FIG. 3A, the vertical distance between the lowest point of each joining wall 16*c* and the highest point of the corresponding projection 17 is defined as a first distance $\Delta 1$. The vertical distance between the upper end (the distal end) of each second flange 16 and the bottom of the corresponding first flange 13 that faces the second flange 16 in the vertical direction is defined as a second distance $\Delta 2$. The first distance $\Delta 1$ is equal to the second distance $\Delta 2$.

The second vertical walls 14 of the upper rail 4 each have a substantially square inner opening 14*a* at a longitudinal middle section. The second flanges 16 of the upper rail 4 each have a substantially square outer opening 16*b* at an upper end portion (i.e., the second upper ball guide 16*a*). The inner opening 14*a* and the outer opening 16*b* are positioned at the same location in the longitudinal direction of the upper rail 4, and the outer opening 16*b* communicates with the inner opening 14*a* in the width direction. In particular, the outer opening 16*b* is a cutout that is open upward.

The second vertical walls 14 each include a circular shaft mounting hole 14*b* in front of the inner opening 14*a*. The two shaft mounting holes 14*b* are concentric and in communication with each other in the width direction. A columnar supporting shaft 22 is inserted into the shaft mounting holes 14*b* and has two end portions secured to the respective shaft mounting holes 14*b*. Thus, the supporting shaft 22 is supported by the second vertical walls 14. The center line of the supporting shaft 22 extends in the width direction.

A lock lever 30 is rotationally coupled to the interior between the second vertical walls 14 of the upper rail 4 with the supporting shaft 22. In particular, the lock lever 30 includes a lever 31, which is made of a plate extending in the front-rear direction. The lever 31 includes a pair of vertical walls 32, which extends in the longitudinal direction of the lever 31. The vertical walls 32 are arranged side by side in the width direction. The widthwise distance between the vertical walls 32 is less than the widthwise distance between the second vertical walls 14 of the upper rail 4. The front end portions of the vertical walls 32 have top edges connected to each other with a connection wall 33. The rear end portions of the vertical walls 32 have top edges connected to each other with a top board 34.

The vertical walls 32 each include an oblong hole 35, which extends in the front-rear direction and is positioned at the same height as the supporting shaft 22 (the shaft mounting holes 14*b*). The dimension of the oblong hole 35 in the transverse direction (vertical direction) is set equal to the diameter of the supporting shaft 22. The vertical walls 32 of the lever 31 are sandwiched by the second vertical walls 14 of the upper rail 4 in the width direction. In this state, the supporting shaft 22 is inserted through the oblong holes 35 of the vertical walls 32 and has the ends secured to the shaft mounting holes 14*b*. This allows the coupled lever 31 to move in the front-rear direction within the oblong holes 35 and vertically rotate relative to the upper rail 4.

The lever 31 includes a pair of insertion forming portions 36 and 37, which extends from the respective front ends of the vertical walls 32 toward the vehicle front. The insertion forming portions 36 and 37 decrease in size to be lower than the front ends of the vertical walls 32 and come closer in the width direction to form a handle insertion 38.

The vertical walls 32 each have a pair of fitting pieces 32*a* at the rear end portion. The fitting pieces extend downward from the lower end of the rear end portion and are arranged in the front-rear direction at an interval. The lock lever 30 includes a lock plate 39, which is made of a plate that extends in the front-rear direction and the width direction while passing through the inner openings 14*a* and the outer openings 16*b* of the upper rail 4. The lock plate 39 includes a total of four slit-like fitting holes 39*a*, which are vertically open while facing the fitting pieces 32*a* of the lever 31. The lock plate 39 is fixed to the lever 31 by inserting each fitting piece 32*a* into the corresponding fitting hole 39*a* and securing the fitting piece 32*a* to the fitting hole 39*a*.

The lock plate 39 has stopper holes 39*b* (the number of which is three in the present embodiment) at each of two widthwise side portions. The stopper holes 39*b* of each side portion are located outward of the corresponding fitting pieces 32*a* of the lever 31 in the width direction and arranged side by side in the front-rear direction at the same intervals as the intervals of the cutouts 13*a* of the lower rail 3. Referring to FIG. 3B, the three stopper holes 39*b* face the corresponding first flange 13 of the lower rail 3 and are vertically open. The stopper holes 39*b* are arranged to fit adjacent ones (three) of the locking teeth 13*b* of the first flange 13 in the longitudinal direction of the lower rail 3.

As shown in FIG. 3B with a solid line, when the lock lever 30 rotates around the supporting shaft 22 such that the lock plate 39 moves up, each stopper hole 39*b* receives the corresponding locking tooth 13*b*. This restricts the relative movement between the lower rail 3 and the upper rail 4. As shown in FIG. 3B with a long dashed double-short dashed line, when the lock lever 30 rotates around the supporting shaft 22 such that the lock plate 39 moves down, the stopper hole 39*b* comes off from the locking tooth 13*b*. This cancels the restriction on the relative movement between the lower rail 3 and the upper rail 4.

The widthwise size of the lock plate 39 is set greater than the widthwise distance between the second upper ball guides 16*a* of the upper rail 4 and less than the widthwise distance between the second flanges 16, which are located below the second upper ball guides 16*a*. Thus, the lock plate 39, which restricts the relative movement between the lower rail 3 and the upper rail 4, passes through the outer openings 16*b* in the width direction. However, the lock plate 39 does not obstruct the second flanges 16 when the restriction on the relative movement is canceled.

As shown in FIG. 2, a lock spring 50 made of one wire is arranged inside the upper rail 4. The lock spring 50 is shaped to split on the front side as viewed from the top. The lock spring 50 has a pair of extended portions 51, which symmetrically extends in the front-rear direction, and an arched connection portion 52, which connects the rear ends of the extended portions 51. As referred to in FIG. 4A and FIG. 4B together, the lock spring 50 has wedged portions 53, which are each formed by shaping a curve at the longitudinal middle section of each extended portion 51, and a lever-side stopper end portion 54, which is formed by bending the connection portion 52 upwardly. The front end portion of the extended portion 51 includes a rail-side stopper end portion 55.

While putting the wedged portions 53 on the supporting shaft 22 from above, the supporting shaft 22 is inserted into the wedged portions 53, which sandwich the supporting shaft 22. The lever-side stopper end portion 54 is inserted through the lock plate 39 from below and fixed to the lock plate 39. In this state, the rail-side stopper end portions 55 of the lock spring 50 come into contact with the bottom surface of the top wall 15 of the upper rail 4. In this way, the lock spring 50 is supported by the upper rail 4 and the like.

The lock spring 50 urges the lock lever 30 to rotate in a direction in which the lock plate 39 moves up at the rear end portions of the extended portions 51, i.e., a direction in which each stopper hole 39*b* of the lock plate 39 engages with the corresponding locking tooth 13*b*. With the reaction force from the lock lever 30, the lock spring 50 urges the supporting shaft 22 to move down, i.e., in the direction crossing the longitudinal direction of the oblong holes 35, at the wedged portions 53. This restricts the forward and rearward movement of the supporting shaft 22 within the oblong holes 35. As a result, the position in the front-rear direction of the supporting shaft 22 is maintained in the oblong holes 35 with the wedged portions 53 of the lock spring 50.

As shown in FIG. 2, the release handle 6 is formed by bending and shaping a pipe. The release handle 6 extends to connect the two upper rails 4 on the front side. The release handle 6 has distal ends 61 extending toward the back of the release handle 6. Each distal end 61 has a flat tubular shape with a decreased width. The distal end 61 has a widthwise inner dimension greater than the width of the corresponding handle insertion 38 and a widthwise outer dimension less than the widthwise distance between the two second vertical walls 14 of the corresponding upper rail 4. The distal end 61 is inserted into the upper rail 4 from the opened end on the front side of the upper rail 4. The handle insertion 38 is then inserted into the distal end 61 so that the distal end 61 is coupled to the lock lever 30. As a result, the distal end 61 basically rotates around the supporting shaft 22 integrally with the lock lever 30. The distal end 61 has a lower portion including a slit-like supporting groove 62, which extends in the width direction.

A handle spring 65 made of one wire is arranged inside the upper rail 4. The handle spring 65 is shaped to split on the rear side as viewed from the top. The handle spring 65 has a pair of extended portions 66, which symmetrically extends in the front-rear direction, and a connection portion 67, which connects the front ends of the extended portions 66 in the width direction.

As shown in FIG. 4B, the connection portion 67 of the handle spring 65 fits in the supporting groove 62 of the distal end 61 (the release handle 6), into which the handle insertion 38 is inserted. The extended portions 66 of the handle spring 65 have rear end portions that come into contact with the bottom surface of the connection wall 33 of the lock lever 30 (the lever 31) behind the supporting shaft 22. The handle spring 65, which engages with the supporting groove 62, urges the distal end 61 to move up.

The front end portion of the handle insertion 38, which is inserted into the distal end 61, supports the distal end 61 such that the distal end 61 is able to swing vertically on the vehicle-front side from the supporting groove 62 (i.e., in a position in which the handle spring 65 urges the distal end 61). The handle spring 65, which engages with the supporting groove 62, urges the distal end 61 to move up. This configuration regulates the orientation of the distal end 61 relative to the lock lever 30.

When the front end of the distal end 61 is raised, the lock lever 30 rotates around the supporting shaft 22 together with the distal end 61 against the urging force of the lock spring 50 in the direction in which the lock plate 39 moves down, i.e., the direction in which each stopper hole 39*b* of the lock plate 39 is released from the corresponding locking tooth 13*b*.

It is now assumed that the force that operates the release handle 6 is removed. In this case, the lock spring 50 applies urging force to the lock lever 30 together with the distal end 61 (the release handle 6) to rotate around the supporting shaft 22 in the direction in which the lock plate 39 moves up, i.e., the direction in which each stopper hole 39*b* of the lock plate 39 engages with the corresponding locking tooth 13*b*. This restricts the relative movement between the lower rail 3 and the upper rail 4. As a result, the seat 5, which is supported by the upper rail 4, is maintained at the position in the front-rear direction.

It is then assumed that the release handle 6 has been operated to raise the front end. In this case, the lock lever 30 rotates around the supporting shaft 22 together with the distal end 61 (the release handle 6) against the urging force from the lock spring 50 in the direction in which the lock plate 39 moves down, i.e., the direction in which each stopper hole 39b of the lock plate 39 is released from the corresponding locking tooth 13b. This cancels the restriction on the relative movement between the lower rail 3 and the upper rail 4 so that the position of the seat 5, which is supported by the upper rail 4, is adjustable in the front-rear direction.

Operation of the present embodiment will now be described.

Figure 5:
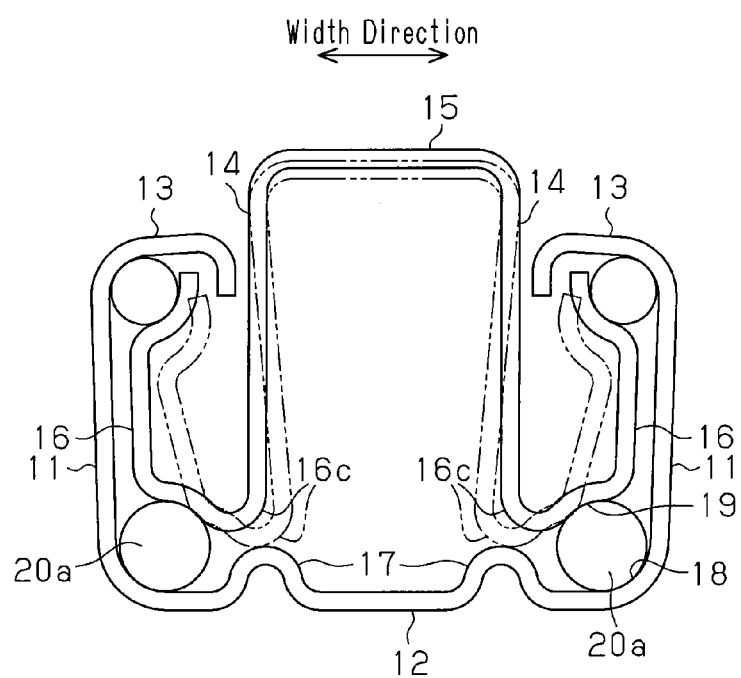
FIG. 5 is a front cross-sectional view of the seat slide device for a vehicle of FIG. 2, illustrating operation of the device.
Figure 6:
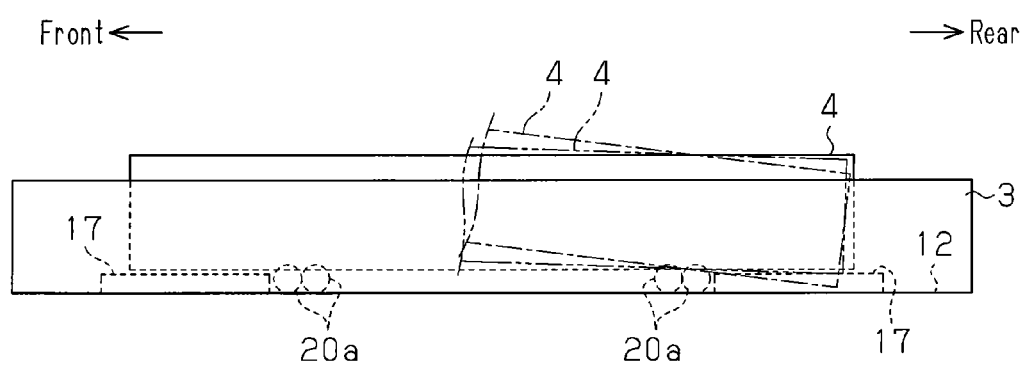
FIG. 6 is a schematic diagram of the seat slide device for a vehicle of FIG. 2, illustrating operation of the device.

For example, when a collision from the rear applies a heavy load in the front-rear direction to the seat 5 and the seat slide device, a vertical bending moment is generated around the positions in the front-rear direction of the corresponding lower balls 20a in the lower rail 3 and the upper rail 4. It is assumed, in this state, that the second vertical walls 14 of the upper rail 4 are deformed inward while being guided by the lower balls 20a as shown in FIGS. 5 and 6 with long dashed double-short dashed lines. The upper rail 4 is bent and deformed such that the rear end of the upper rail 4 moves down. In this case, the joining walls 16c of the upper rail 4 come into contact with the projections 17 of the lower rail 3 at the rear end of the upper rail 4 as indicated by the long dashed double-short dashed lines. This suppresses the progress of bending deformation in the upper rail 4. In particular, the projections 17 are configured to come into contact with the joining walls 16c when the downward load on the upper rail 4 causes deformation of the second vertical walls 14 in the upper rail 4. The downward load on the upper rail 4 produces pushing force between the lower balls 20a and the upper rail 4. In a conventional example, the bending deformation of the upper rail 4 progresses unless the rear end of the upper rail 4 contacts the top surface of the bottom wall 12 in the lower rail 3 as shown in FIG. 6 with a long dashed short dashed line. However, the present embodiment promptly suppresses the progress of the bending deformation.

As shown in FIG. 5 with the long dashed double-short dashed line, when the second lower ball guides 19 of the upper rail 4 are deformed while being guided by the lower balls 20a, the joining walls 16c abut against the projections 17 along with the deformation. In this form, the joining walls 16c are especially designed such that the abutted portions of the projections 17 are located outward of the highest points of the projections 17 in the width direction. In other words, the projections 17 are arranged such that the portions of the projections 17 that are located outward of the highest points of the projections 17 in the width direction are located on the paths of deformation of the joining walls 16c.

The operation when a collision from the front applies a heavy load in the front-rear direction is similar to the operation in the collision from the rear except that the relationship between the front and the rear is reversed.

The present embodiment as described above achieves the following advantages.

(1) In the present embodiment, when a collision (from the front or the rear) bends and deforms the upper rail 4 such that a distal end (the front end or the rear end) of the upper rail 4 moves down, the joining walls 16c come into contact with the projections 17 at the distal end. This promptly suppresses the progress of bending deformation in the upper rail 4.

(2) In the present embodiment, the upper rail 4 receives a downward load at the positions of lower balls 20a on both widthwise sides, for example, when a collision applies a heavy load in the front-rear direction. This deforms both second lower ball guides 19, and the second lower ball guides 19, together with the joining walls 16c, are likely to move toward the widthwise center while being guided by the lower balls 20a. However, since the projections 17 have the highest points located closer to the widthwise center than the lowest points of the joining walls 16c, it is highly likely that the joining walls 16c will abut against portions of the corresponding projections 17 that are located outward of the highest points of the projections 17 in the width direction at a distal end (the front end or the rear end) of the upper rail 4. This reduces the possibility of a large deformation of the second vertical walls 14 toward the widthwise center, and the progress of bending deformation in the upper rail 4 is further reliably suppressed.

(3) In the present embodiment, the projections 17 of the lower rail 3 are arranged such that portions of the projections 17 that are located outward of the highest points of the projections 17 in the width direction are located on the paths of the deformation of the joining walls 16c when the second lower ball guides 19 are deformed while being guided by the corresponding lower balls 20a. For example, when a collision applies a heavy load in the front-rear direction to the second lower ball guides 19 so that the second lower ball guides 19 are deformed while being guided by the corresponding lower balls 20a, the joining walls 16c abut against portions of the projections 17 at a distal end (the front or rear end) of the upper rail 4, and the portions are located outward of the highest points of the projections 17. This reliably suppresses the progress of bending deformation in the upper rail 4.

(4) In the present embodiment, the vertical distance $\Delta 1$ between the lowest point of a joining wall 16c and the highest point of the corresponding projection 17 is set equal to the vertical distance $\Delta 2$ between the top end of the corresponding second flange 16 and the bottom surface of the first flange 13 that vertically faces the second flange 16. For example, when a collision applies a heavy load in the front-rear direction, a distal end (the front or rear end) of the upper rail 4 moves down, while the opposite end (the rear or front end) moves up. If the downward moving amount of the distal end is equal to the upward moving amount of the opposite end in the upper rail 4, the upper rail 4 has a bottom contacting the projections 17 at the distal end. At the same time, the top ends of the second flanges 16 come into contact with the bottom surfaces of the first flanges 13 at the opposite end of the upper rail 4. These factors cooperate to further reliably suppress the progress of bending deformation in the upper rail 4.

(5) In the present embodiment, the projections 17 of the lower rail 3 are arranged in the movable ranges of the distal ends (the front and rear end) of the upper rail 4 relative to the lower rail 3, except the mounting positions of the lower rail 3 on the vehicle floor 2. Thus, as long as the upper rail 4 has a distal end (the front or rear end) located on the lower rail 3 (the bottom wall 12) except the mounting position on the vehicle floor 2, the corresponding ones of the projections 17 constantly exist below the distal end of the upper rail 4. This eases the locational limitation of the upper rail 4 relative to the lower rail 3, which suppresses the progress of bending deformation in the upper rail 4.

(6) In the present embodiment, the radiuses of the lower balls 20a are set greater than the radiuses of the upper balls 20b. The radiuses of the lower balls 20a being greater than the radiuses of the upper balls 20b increases the vertical distance between the lower rail 3 (the bottom wall 12) and the upper rail 4. Thus, the upper rail 4 is easily bent and deformed such that a distal end (the front or rear end) of the upper rail 4 moves down. Employing the projections 17 in such a configuration further effectively suppresses the progress of bending deformation in the upper rail 4.

(7) In the present embodiment, the radiuses of the lower balls 20a are greater than the radiuses of the upper balls 20b so that the vertical distance between the lower rail 3 (the bottom wall 12) and the upper rail 4 is ensured to be relatively large. Thus, the flanges 21b of the mounting bolts 21 are kept from obstructing the bottom surface of the upper rail 4 without specially treating the mounting positions (e.g., lowering the sitting surface) of the bottom wall 12 on the vehicle floor 2.

The above illustrated embodiment may be modified in the following forms.

Figure 7:
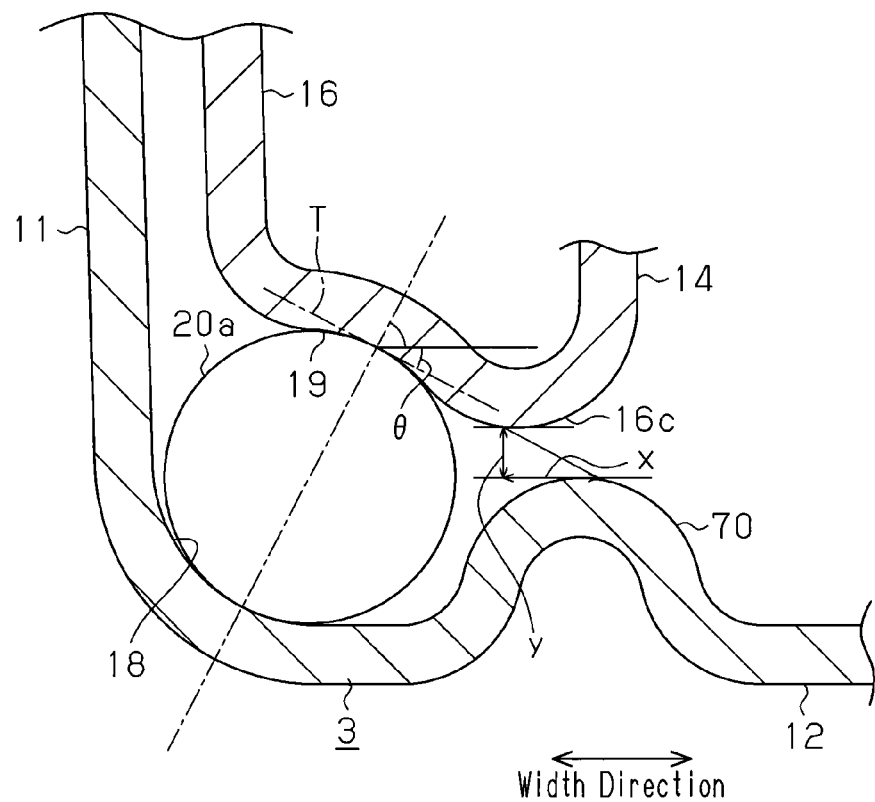
FIG. 7 is a cross-sectional view illustrating a modification of the seat slide device for a vehicle of FIG. 2.
Figure 8:
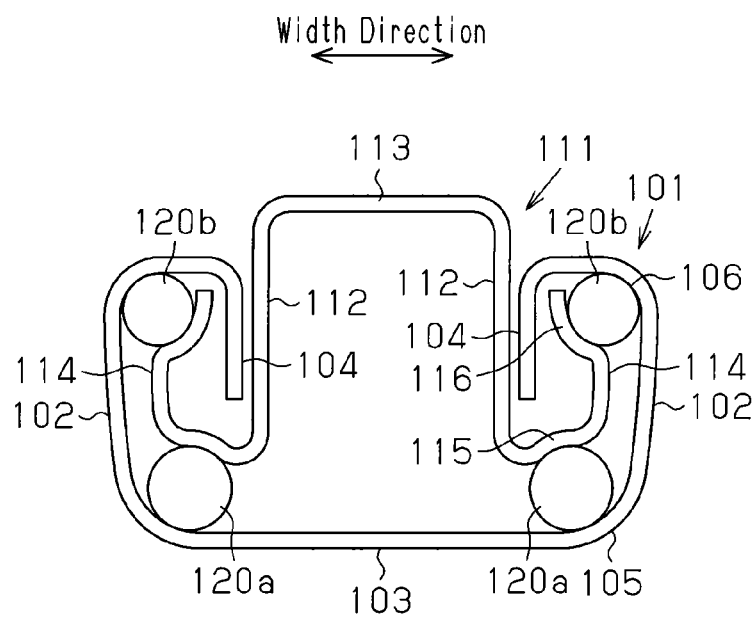
FIG. 8 is a front cross-sectional view of a conventional seat slide device for a vehicle.
Figure 9:
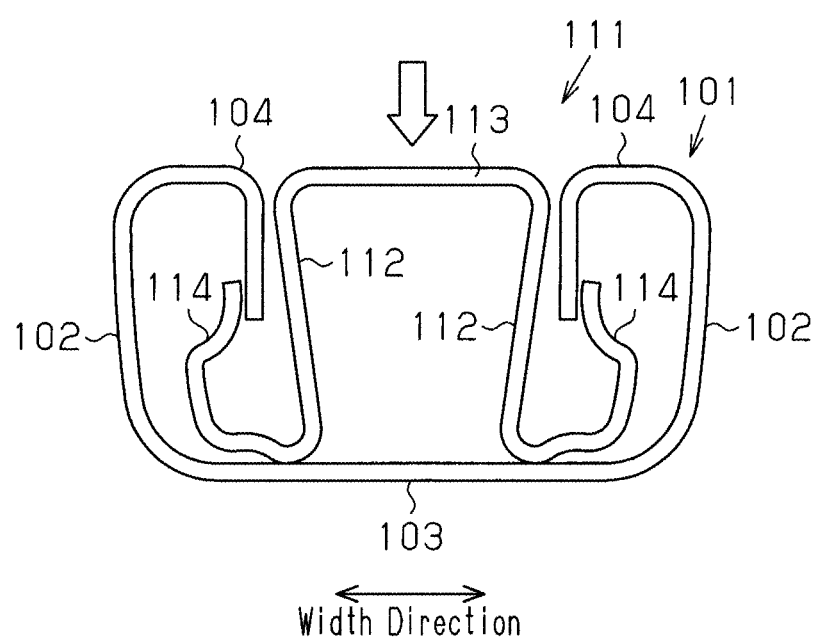
FIG. 9 is a front cross-sectional view of the seat slide device for a vehicle of FIG. 8, illustrating operation of the device.

As shown in FIG. 7, a projection (a restricting member) 70, which satisfies the relationship represented by the following expression, may be arranged on the bottom wall 12 of the lower rail 3. In the following expression, the widthwise distance between the highest point of the projection 70 and the lowest point of the corresponding joining wall 16c is expressed by x, the vertical distance between the highest point of the projection 70 and the lowest point of the joining wall 16c is expressed by y, and the angle between the width direction and the tangent line of the corresponding second lower ball guide 19 and the corresponding lower ball 20a is expressed by θ. In this case, the projection 70 is configured and arranged to satisfy the following relational expression.

$$x \geq y/\tan \theta$$

For example, it is assumed that the second lower ball guide 19, which is guided by the lower ball 20a, changes the position together with the joining wall 16c toward the widthwise center along the tangent line T when a collision applies a heavy load in the front-rear direction. When the lowest point of the joining wall 16c moves down by the distance y, the positional change toward the widthwise center is y/tan θ. Thus, when the positional change is less than or equal to the distance x (x≥y/tan θ), the possibility is further increased that the joining wall 16c will abut against a portion of the projection 70 that is located outward of the highest point of the projection 70 in the width direction. This further reliably suppresses the progress of bending deformation in the upper rail 4.

In the above illustrated embodiment, the distance Δ1, which is the vertical distance between the lowest point of the joining wall 16c and the highest point of the corresponding projection 17, does not necessarily need to be equal to the distance Δ2, which is the vertical distance between the top end of the corresponding second flange 16 and the bottom surface of the first flange 13, which vertically faces the second flange 16.

In the above illustrated embodiment, the joining wall 16c does not necessarily need to abut against a portion of the corresponding projection 17 that is located outward of the highest point of the projection 17 at a distal end (the front or rear end) of the upper rail 4 when the corresponding second lower ball guide 19 is deformed while being guided by the corresponding lower ball 20a.

In the above illustrated embodiment, the highest point of a projection 17 does not necessarily need to be arranged closer to the center than the lowest point of the corresponding joining wall 16c.

In the above illustrated embodiment, the projections 17, 70 may be replaced by restricting members that have a similar function on the bottom wall 12 of the lower rail 3.

In the above illustrated embodiment, a restricting member (such as a projection 17 or 70) may extend longitudinally over the bottom wall 12 of the lower rail 3. The restricting member may be integrated with the bottom wall 12, or may be arranged separately from the bottom wall 12.

In the above illustrated embodiment, a plurality of projection-like restricting members may be longitudinally arranged on the bottom wall 12 at intervals. The upper rail 4 is locked at predetermined intervals by the lock lever 30, and a distal end (the front or rear end) of the upper rail 4 is held at the same predetermined intervals in the longitudinal direction. Thus, the restricting members in the above case are arranged at intervals that are the same as or correspond to the intervals at which the upper rail 4 is locked. The restricting members may integrate with the bottom wall 12 or may be arranged separately from the bottom wall 12.

In the above illustrated embodiment, only one of the front and rear end portions of the lower rail 3 (the bottom wall 12) may have a restricting member (such as a projection 17 or 70). In this case, the progress of bending deformation in the upper rail 4 is suppressed only when the corresponding one of the front and rear ends moves down in the upper rail 4.

In the above illustrated embodiment, a restricting member (such as a projection 17 or 70) may be arranged at any location on the lower rail 3 (the bottom wall 12) in the front-rear direction.

In the above illustrated embodiment, the cross-sectional shape of each restricting member (the projections 17 and 70) is not limited to a substantially semicircular shape. For example, a polygonal shape or another shape may be employed. That is, the restricting member may have any cross-sectional shape as long as the restricting member contacts the corresponding joining wall 16c when a downward load on the upper rail 4 deforms the second vertical walls 14.

In the above illustrated embodiment, the lower rail 3 may have a structure having a plurality of plates joined by welding or the like. The above illustrated cross-sectional shape of the lower rail 3 is merely an example. The lower rail 3 may have any other shape as long as the lower rail 3 includes the bottom wall 12 having a restricting member, at least one first vertical wall 11, and at least one first flange 13. It is apparent that the lower rail 3 does not necessarily need to have a symmetrical shape having a pair of first vertical walls 11 and a pair of first flanges 13.

In the above illustrated embodiment, the upper rail 4 may have a structure having a plurality of plates joined by welding or the like. The cross-sectional shape of the upper rail 4 is merely an example. The upper rail 4 may have any other shape as long as the upper rail 4 has at least one second vertical wall 14 and at least one second flange 16. It is apparent that the upper rail 4 does not necessarily need to have a symmetrical shape having a pair of second vertical walls 14 and a pair of second flanges 16.

In the above illustrated embodiment, the radiuses of the lower balls 20a may be set equal to or less than the radiuses of the upper balls 20b.

In the above illustrated embodiment, the upper balls 20b may be replaced by appropriate sliding members or rollers. The upper balls 20b and the supporting structure of the upper balls 20b may be omitted.

In the above illustrated embodiment, the fixing relationships (i.e., the vertical arrangements) between the lower rail 3 and the upper rail 4 and between the vehicle floor 2 and the seat 5 may be reversed.

In the above illustrated embodiment, only one set of the lower rail 3 and the upper rail 4 (a seat slide device for a vehicle) may be provided for the seat 5, or, three or more sets of the lower rail 3 and the upper rail 4 may be provided for the seat 5.

The invention claimed is:

1. A seat slide device for a vehicle, comprising:
a first rail adapted to extend in a vehicle front-rear direction, wherein the first rail includes: a first horizontal wall;
a first vertical wall that extends from at least one end in a width direction of the first horizontal wall; and
a first flange that projects in the width direction from a distal end of the first vertical wall to overhang the first horizontal wall and is folded back toward the first horizontal wall;
a second rail, which is coupled to the first rail to be movable in the vehicle front-rear direction, wherein the second rail includes:
a second vertical wall that is arranged on an opposite side of the first vertical wall from the first flange in the width direction and has an end portion close to the first horizontal wall;
a second flange that projects in the width direction from the end portion of the second vertical wall toward the first vertical wall and is folded back toward an area between the first vertical wall and the first flange; and
a joining wall that is arranged between the second vertical wall and the second flange;
a first ball guide that is formed in a coupling portion between the first horizontal wall and the first vertical wall;
a second ball guide that is formed in a basal portion of the second flange;
a first ball that is rotationally arranged between the first ball guide and the second ball guide; and
a restricting member that projects from a portion of the first horizontal wall that is closer to a distal end of the first rail than at least the first ball in the vehicle front-rear direction and reduces a vertical space between the joining wall and the first horizontal wall, wherein the restricting member contacts the joining wall when the second vertical wall is deformed due to a load that is applied to produce pushing force between the first ball and the second rail.

2. The seat slide device for a vehicle according to claim 1, wherein:
the first rail is a lower rail in which the first vertical wall extends upward from the at least one end of the first horizontal wall, and the first flange projects in the width direction from a top end of the first vertical wall and is folded back downward, the second rail is an upper rail in which the second flange projects in the width direction from a lower end of the second vertical wall and is folded back upward and toward an area between the first vertical wall and the first flange, the first ball is a lower ball, which is rotationally arranged between a first lower ball guide as the first ball guide and a second lower ball guide as the second ball guide, and
the restricting member contacts the joining wall when the second vertical wall is deformed due to a downward load applied to the second rail.

3. The seat slide device for a vehicle according to claim 1, wherein:
the first vertical wall, the first flange, and the first ball guide form a set, and the set is one of two sets that are included in the first rail and arranged in the width direction,
the second vertical wall, the second flange, and the second ball guide form a set, and the set is one of two sets that are included in the second rail and arranged in the width direction,
the second rail further includes a second horizontal wall, which connects ends of the second vertical walls that are distant from the first horizontal wall to each other in the width direction,
the first ball is one of a pair of first balls that are arranged in the width direction,
the restricting member is one of a pair of restricting members that are arranged in the width direction on the first horizontal wall, and
a vertical extremity of each restricting member is positioned closer to a center of the first and second rails than a vertical extremity of the corresponding joining wall in the width direction.

4. The seat slide device for a vehicle according to claim 3, wherein each restricting member is configured and arranged to satisfy the relationship $x \geq y/\tan \theta$ where a distance in the width direction between the extremity of each restricting member and the extremity of the corresponding joining wall is defined as x, a vertical distance between the extremity of each restricting member and the extremity of the corresponding joining wall is defined as y, and an angle between the width direction and a tangent line of each second ball guide and the corresponding first ball is defined as $\theta$.

5. The seat slide device for a vehicle according to claim 3, wherein the restricting members are arranged such that, when the second ball guides are guided by the first balls and deformed, a portion of each restricting member that is located outward of the extremity of the restricting member in the width direction is located on a path of deformation of the corresponding joining wall.

6. The seat slide device for a vehicle according to claim 1, further comprising a second ball, which is rotationally arranged between a distal end portion of the second flange and a coupling portion between the first vertical wall and the first flange, wherein a radius of the first ball is greater than a radius of the second ball.

7. The seat slide device for a vehicle according to claim 1, wherein:
a vertical distance between a vertical extremity of the joining wall and a vertical extremity of the restricting member is defined as a first distance,
a vertical distance between a distal end of the second flange and a portion of the first flange that vertically faces the second flange is defined as a second distance, and the first distance is equal to the second distance.

8. The seat slide device for a vehicle according to claim 1, wherein:
the first rail has a mounting position at which the first rail is mounted to a vehicle floor or a vehicle seat,
the second rail has a distal end in the vehicle front-rear direction, and
the restricting member is arranged in a movable range of the distal end of the second rail relative to the first rail except the mounting position.

* * * * *